United States Patent
Jacobs et al.

(10) Patent No.: US 8,616,533 B2
(45) Date of Patent: Dec. 31, 2013

(54) CONFIGURATIONS AND METHODS OF GAS-ASSISTED SPRAY NOZZLES

(75) Inventors: Garry E. Jacobs, Aliso Viejo, CA (US); Walt Stupin, Whittier, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 343 days.

(21) Appl. No.: 13/120,105

(22) PCT Filed: Sep. 30, 2009

(86) PCT No.: PCT/US2009/058935
§ 371 (c)(1),
(2), (4) Date: Mar. 21, 2011

(87) PCT Pub. No.: WO2010/039767
PCT Pub. Date: Apr. 8, 2010

(65) Prior Publication Data
US 2011/0175244 A1 Jul. 21, 2011

Related U.S. Application Data

(60) Provisional application No. 61/101,861, filed on Oct. 1, 2008.

(51) Int. Cl.
*B01F 3/04* (2006.01)
(52) U.S. Cl.
USPC .......................................... 261/78.2; 261/128
(58) Field of Classification Search
USPC ................................. 261/78.2, 128
See application file for complete search history.

(56) References Cited

U.S. PATENT DOCUMENTS

| 3,474,970 | A | | 10/1969 | Simmons et al. |
| 4,401,561 | A | | 8/1983 | Thompson et al. |
| 4,568,022 | A | | 2/1986 | Scrivnor |
| 4,708,787 | A | * | 11/1987 | Peters et al. ............... 208/130 |
| 4,815,665 | A | | 3/1989 | Haruch |
| 5,603,453 | A | | 2/1997 | Weaver et al. |
| 5,644,608 | A | | 7/1997 | Malik et al. |
| 5,858,206 | A | | 1/1999 | Castillo |
| 6,075,101 | A | | 6/2000 | Lynn et al. |
| 6,141,986 | A | | 11/2000 | Koplin |
| 6,322,003 | B1 | | 11/2001 | Haruch |
| 6,832,754 | B2 | | 12/2004 | Cross |
| 7,454,742 | B2 | | 11/2008 | Nelson |
| 2004/0044090 | A1 | | 3/2004 | Font Freide et al. |
| 2007/0138061 | A1 | | 6/2007 | Costinel |

FOREIGN PATENT DOCUMENTS

WO 93/20948 10/1993

OTHER PUBLICATIONS

Lu, C. et al., "Carbonizer Tests With Lakeland Feedstocks", Phase 2 Task 4 Topical Report, U.S. Department of Engergy, Contract No. DE-AC21-86MC21023, Second Generation Pressurized Fluidized Bed Research and Development; Foster Wheeler Development Corporation, Sep. 2003.

* cited by examiner

Primary Examiner — Robert A Hopkins
(74) Attorney, Agent, or Firm — Fish & Associates, PC

(57) ABSTRACT

Contemplated configurations and methods are drawn to systems in which gas assisted spray nozzles are used to distribute a liquid phase in micron-sized droplets in a device effluent at a position upstream of a second device having multiple parallel flow paths for the effluent. Most preferably, the assist gas is a high-pressure gas phase that is generated in a process upstream of the device effluent, the first device is a hydrotreating or hydrocracking reactor or distillation column, and the second device is an air cooler or heat exchanger.

16 Claims, 1 Drawing Sheet

CONFIGURATIONS AND METHODS OF GAS-ASSISTED SPRAY NOZZLES

This application claims priority to our copending U.S. provisional application with the Ser. No. 61/101,861, which was filed Oct. 1, 2008. This and all other extrinsic materials referred to herein are incorporated by reference in their entirety.

FIELD OF THE INVENTION

The field of the invention is configurations and methods for distributed injection of fluids into a gas phase or gas/liquid phase, preferably upstream of a plurality of flow paths for the gas phase.

BACKGROUND OF THE INVENTION

Numerous systems and methods are known in the art where fluid is injected into a gas phase using one or more spray nozzles to ensure relatively fine distribution of the fluid in the gas stream (see e.g., U.S. Pat. No. 4,568,022 or U.S. Pat. No. 6,141,986). While most of these systems will operate satisfactorily for their intended purpose, problems are often encountered where the gas phase includes components that can deposit on, corrode, or plug the downstream flow path.

For example, most currently known hydrotreating and hydrocracking units produce an effluent gas or gas/liquid mixture having a temperature of above 250° F. at pressures ranging from 400 to 2800 psig. The effluent typically contains varying concentrations of hydrogen sulfide, hydrogen chloride, and ammonia. To help prevent these compounds from forming corrosive solid deposits in downstream conduits and/or devices, wash water is often injected upstream of the reactor effluent air cooler (REAC) or water cooler. The wash water injection rate is typically adjusted such that a predetermined fraction of the injected water remains unvaporized (assuming the effluent and water will mix sufficiently to reach equilibrium) or such that a predetermined ammonium bisulfide concentration is achieved in a downstream positioned high-pressure separator. In many instances, it is very important that the unvaporized liquid be well distributed in the downstream flow path. In most known configurations, wash water injection is typically performed using spray nozzles or injection quills that produce about millimeter-sized droplets. Unfortunately, such relatively large droplet size is typically associated with reduced heat and mass transfer and a high rate of gravity settling, leading to droplet coalescence and maldistribution of the injected water. Such problems are often associated with plugging of some exchanger tubes and concurrent under-deposit corrosion while the remaining operating tubes will be subjected to high effluent flow and erosion-corrosion.

To circumvent at least some of the problems associated with low heat and/or mass transfer and with ammonium salt deposits, the wash water injection point can be located at a maximal distance upstream of the REAC. However, such a configuration does not necessarily improve the downstream distribution of the unvaporized water. In an attempt to mitigate maldistribution, specific criteria can be used in the design of the piping manifold upstream of the REAC. While such design features tend to improve heat and mass transfer and distribution to at least some degree, achieving these objectives is still hampered by the undesirably large water droplets which tend to coalesce and form a stratified-wavy or semi-annular free water phase downstream of the injection point.

It is well known that droplet size can be reduced using non-assisted pressure jet or pressure-swirl type atomization nozzles (e.g., U.S. Pat. No. 5,644,608). However, it should be noted that such nozzles at the required water flow rates require in most cases prohibitively high differential pressure (e.g., 100 to 700 psi) to produce sufficiently small droplets (e.g., micron-sized droplets). Moreover, even if one would use such nozzles, the very small orifices of such nozzles are often easily plugged in an industrial setting, with the potential for high fluid velocity-induced erosion. Still further, steam pressure levels in refineries do not typically exceed 600 psig. Therefore, suitably high pressure steam is typically not available for use as an assist gas in the relatively high pressure environments that exist in many hydroprocessing units.

Therefore, it should be appreciated that currently known configurations and methods for water injection in the hydrotreater/hydrocracker effluent have several disadvantages that result in reduced heat and mass transfer, non-homogenous distribution of the water droplets, and/or disruption in operation. Thus, there is still a need for improved configurations and methods for injection of fluids into a gas phase, and especially injection of fluids into a gas phase or gas/liquid mixture upstream of a heat exchanger, to achieve high mass and heat transfer as well as more homogenous distribution of the injected fluid.

SUMMARY OF THE INVENTION

The present invention is directed to configurations and methods in which gas-assisted spray nozzles are used to distribute a fluid phase (most preferably water or a water-containing fluid) into a reactor or other vessel vapor effluent as micron-sized droplets, wherein the assist gas of the nozzles is preferably a process gas used in the formation of the effluent. Moreover, use of gas assisted spray nozzles will not only improve mass/heat transfer and reliability, but will also reduce the potential for clogging and erosion/corrosion.

Therefore, in one particularly preferred aspect of the inventive subject matter, systems and methods are contemplated in which an effluent is treated by injecting micron-sized fluid droplets into the effluent using one or more gas-assisted nozzles, wherein the assist gas for the nozzles comprises a process gas involved in the formation (or downstream processing) of the effluent. Most typically, the so treated effluent is then routed to one or more downstream devices (typically comprising multiple parallel flow paths) that have a heat transfer surface. For example, suitable downstream devices include air coolers or shell-and-tube type heat exchangers, but also high-pressure separators and transfer pipes. In especially preferred configurations and methods, the effluent is produced by a hydrotreater reactor or a hydrocracker reactor, and/or the fluid droplet is a water droplet, typically having a size of less than 500 micron, and even more typically of less than 300 micron. In further preferred aspects, the differential pressure between the process gas and the downstream process is at least 50 psi (and more typically at least 100 psi), and/or the process gas is a hydrogen-containing recycle gas or a hydrogen-rich make-up gas.

Consequently, and viewed from a different perspective, the inventors contemplate a gas treatment system that includes a reactor that is configured to produce a reactor effluent, and a conduit configured to receive the reactor effluent. Such systems will further comprise one or more gas-assisted nozzles that are coupled to the conduit and configured to provide a plurality of micron-sized droplets into the reactor effluent, wherein the assist gas comprises a process gas involved in the formation of the effluent. Most typically, contemplated systems further include a heat exchanger or air cooler that is downstream of and fluidly coupled to the conduit to so contact and cool the effluent gas. With respect to the reactors, process gas, fluid droplets, and heat transfer surfaces, the same considerations as provided above apply.

In a still further contemplated aspect of the inventive subject matter, a gas treatment system may also comprise a distillation or other column that is configured to produce a vapor effluent, and a conduit configured to receive the effluent, wherein one or more gas-assisted nozzles are coupled to the conduit and configured to provide a plurality of micron-sized droplets into the vapor effluent. A heat exchanger or air cooler is downstream of and fluidly coupled to the conduit, wherein the heat exchanger or air cooler are typically configured to receive and cool the effluent gas. Most preferably, the assist gas comprises a process gas that is involved in processing of the column feed and/or in the formation of the effluent, and the micron-sized droplets have a size of less than 300 micron.

Various objects, features, aspects and advantages of the present invention will become more apparent from the following detailed description of preferred embodiments of the invention, along with the accompanying drawing.

DETAILED DESCRIPTION

The inventors have discovered that distributed fluid injection into a gas phase, and especially water injection into a hydrotreater or hydrocracker effluent upstream of a heat exchanger is significantly improved where the fluid is injected by a gas-assisted spray nozzle as such nozzles allow formation of micron-sized droplets. As used herein, the term "micron-sized droplets" refers to droplets with an average diameter of less than 1 millimeter, more typically less than 700 micron, and most typically less than 500 micron. Most preferably, the assist gas is (or comprises) a slip stream of their recycle gas and/or make-up gas from the discharge of their respective compressors in the hydroprocessing hydrotreating/hydrocracking process. With respect to the term "hydroprocessing" it should be noted that this term includes all processes in which hydrogen is used as a reactant, typically at a pressure that is significantly above atmospheric pressure (e.g., above 100 psi). For example, suitable hydroprocessing processes include hydrotreating, hydrocracking, hydrofinishing, etc.

Figure 1:
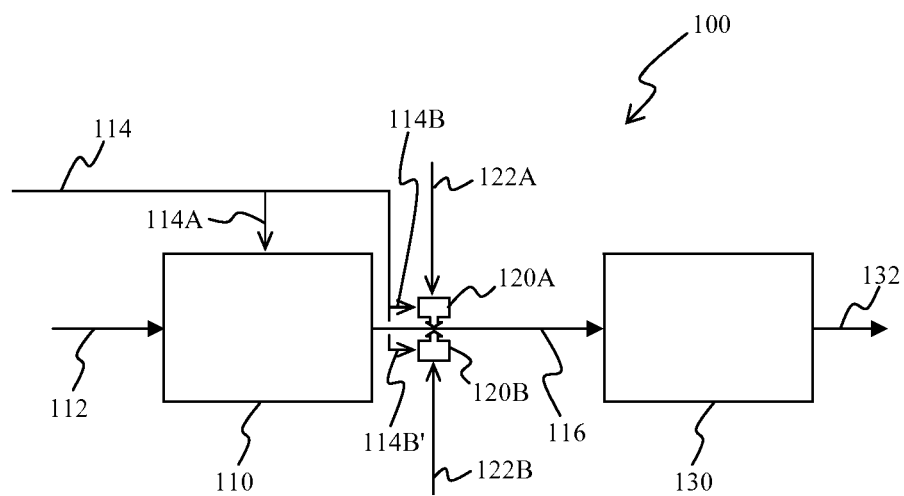
FIG. 1 is a schematic of one exemplary configuration according to the inventive subject matter.

For example, in one aspect of the inventive subject matter as exemplarily depicted in FIG. 1, a plant 100 has a hydroprocessing or fluid catalytic cracking reactor 110 to which effluent cooler 130 is fluidly coupled. Of course, it should be appreciated that in most configurations additional components (e.g., one or more heat exchangers) may be disposed between the outlet of the reactor 110 and the inlet of the effluent cooler 130, which are not shown in FIG. 1. The reactor 110 receives hydrocarbon feed stream 112 and further receives a large fraction 114A (typically at least 25%, more typically at least 50%) of process gas 114, which is in most cases a hydrogen make-up stream and/or a hydrogen-containing recycle stream above the reactor pressure. The remainder of stream 114 is used as assist gas 114B and 114B' in gas-assisted spray nozzles 120A and 120B, respectively. Gas-assisted spray nozzles 120A and 120B receive respective fluid streams 122A and 122B and inject a plurality of micron-sized fluid droplets (e.g., water with 300 micron average droplet size) into the reactor effluent 116. The so treated effluent (which may comprise a plurality of hydrocarbon droplets where the effluent is from a fluid catalytic cracking reactor) enters cooler 130 (typically an air cooler or shell-and-tube type heat exchanger) and leaves the cooler 130 as cooled reactor effluent 132.

Figure 2:
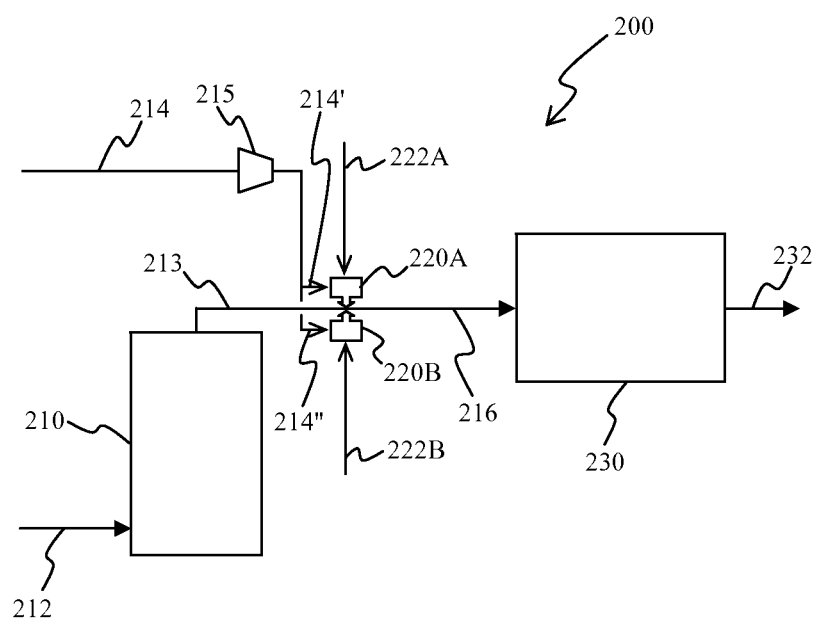
FIG. 2 is a schematic of another exemplary configuration according to the inventive subject matter.

In another example, as schematically depicted in FIG. 2, a plant 200 has a distillation column 210 (e.g., in a crude unit) to which overhead cooler 230 is fluidly coupled. The column 210 receives hydrocarbon feed 212 and produces column overhead vapor 213 at or above atmospheric pressure (e.g., 5-20 psig). Gas assisted spray nozzles 220A and 220B inject a plurality of micron-sized droplets into the overhead vapor using respective water streams 222A and 222B and assist gas streams 214' and 214" to so form treated overhead stream 216. Where desired, the assist gas 214 is pressurized using optional compressor 215. Alternatively, the assist gas stream may be any gaseous or vapor stream that has already a pressure suitable for use as an assist gas in the gas-assisted spray nozzles (e.g., high- or low-pressure steam, or compressed off-gas from column 210, etc.). Thus, the assist gas may be a process gas that is produced or used in the processing of the feed or recovered from the downstream processing of the product. In still further alternative aspects, the assist gas may also be an air stream or more typically a dedicated oxygen-depleted stream (less than 2 vol % $O_2$). The overhead cooler 230 cools the treated overhead stream 216 and so forms the cooled stream 232. Thus, it should be appreciated that gas-assisted nozzles can be employed in many configurations and methods associated with gas treatment upstream of a plurality of parallel flow paths (e.g., injection of water or chemical additives in crude unit atmospheric column overhead systems which operate at pressures typically in the range of 5 psig to 30 psig).

While the use of air- or gas-assisted spray nozzles in various situations is well known in the art, (e.g., for spray atomization of fluids as described in U.S. Pat. Nos. 6,726,127, 6,322,003, 6,036,116, 4,591,099, 4,511,087, 3,474,970, or 4,815,665, or in U.S. Pat. App. No. 2007/138061 or in WO 93/20948, for gas phase polymerization as described in U.S. Pat. No. 6,075,101, for gas/liquid phase transfer as described in U.S. Pat. No. 6,832,754, or for attemperators, such as steam desuperheaters, as described in U.S. Pat. No. 2,354,842), the use of gas-assisted spray nozzles to improve interphase heat and mass transfer and distribution of a partially vaporizing injectant into heat exchangers (e.g., high pressure REAC or other device having multiple parallel flow paths for the effluent) has not been appreciated.

With respect to suitable gas-assisted spray nozzles it is contemplated that all known nozzles are deemed appropriate for use herein (supra). However, especially preferred gas-assisted nozzles include those that are capable of producing water (or other fluid) droplets having a size of less than 1000 microns, more preferably less than 600 microns, even more preferably less than 300 microns, and most preferably less than 100 microns. Thus, it is generally preferred that the micron-sized droplets have a Sauter mean diameter (diameter of a drop having the same volume/surface area ratio as the entire spray) of between 50 and 500 micron. Furthermore, and while not limiting to the inventive subject matter, it is generally preferred that the assist gas is or comprises a gas that is used in the process in which the gas-assisted nozzles are employed (e.g., process gas used in the formation of the effluent or used in a reaction that produces the feed that is routed into the reactor or column). Most advantageously, the pressure of the assist gas is thus already at a level that would otherwise be demanded by the system and so obviates the need for otherwise necessary significant pressurization (however, it should be noted that additional pressurization is expressly contemplated). For example, preferred assist gases may include a portion of recycle gas or make-up gas from the discharge of their respective compressors in a hydrotreating, hydrocracking, or other process. In alternative aspects of the inventive subject matter, suitable assist gases also include steam, inert gases (e.g., $N_2$, Ar, etc.), waste gases (e.g., $CO_2$, etc.), and recycled gases. It should be noted that the person of ordinary skill in the art will readily be able to approximate and direct the size range of the droplets considering, inter alia, the typically available gas phase differential pressure and gas flow rate, as well as the commercially available injection nozzles.

Consequently, it is contemplated that the pressure of the effluent from the reactor is at least 300 psia, more typically at least 500 psia, even more typically at least 800 psia, and most typically at least 1000 psia (e.g., at least 1500 psia, at least 2000 psia, or at least 2400 psia). Alternatively, where the effluent is from a (e.g., distillation or absorber) column, the effluent pressure may be significantly lower, in comparison with hydroprocessing operating pressures. The process gas pressure in contemplated configurations and methods is most typically higher than the effluent pressure of the reactor or column to so provide the driving force for the formation of the smaller liquid droplets, and may therefore be at least 20 psi, at least 50 psi, at least 100 psi, at least 200 psi, or even at least 300 psi higher than the effluent pressure.

With respect to the pressure of the assist gas it is noted that the assist gas pressure is typically increased (relative to the effluent gas pressure) to allow for effective atomization of the fluid. Such increase can be achieved using all known manners, and most commonly by use of one or more compressors. Consequently, it should be appreciated that in most aspects of the inventive subject matter the pressure differential (i.e., pressure difference between effluent pressure and assist gas pressure) for the assist gas is typically at least 10 psi, more typically at least 20 psi, even more typically at least 50 psi, and most typically at least 100 psi. Therefore, it should be appreciated that the energy demand to produce a high-pressure assist gas (e.g., at least 500 psia, or at least 1000 psia, or at least 1500 psia) will typically only equate to the pressure differential for the assist gas. For example, if a slip stream of recycle gas in a hydroprocessing plant is used as assist gas, this gas combined with the effluent returns to the recycle gas compressor for recompression. Similarly, if make-up hydrogen, or a portion thereof, is used as assist gas, the supply pressure has to be higher than if this make-up hydrogen were simply mixed with the effluent (without passing through a spray nozzle with the wash water). For this reason, it is anticipated that the use of make-up hydrogen is typically more energy efficient than the use of recycle gas. In another example, if a slip stream of off-gas from a crude column overhead off-gas compressor is used as assist gas, this gas mixes with the column overhead vapor and returns to the off-gas compressor for recompression. In less preferred aspects, additional compression of the assist gas may be employed.

Consequently, it should be appreciated that various configurations and methods are contemplated in which one or more gas-assisted spray nozzle(s) are employed to substantially reduce droplet size of the injectant into a reactor (or other device) effluent stream, typically from millimeter size to micron-sized droplets (e.g., 10-900 micron, more typically 30-600 micron, most typically 50-500 micron). It should be especially noted that the fluid is injected into a gas or gas/liquid stream that has a relatively high pressure. For example, the reaction section of hydrotreating/hydrocracking processes typically operate at pressures between 400 psig and 2400 psig, while the highest available steam pressure in refineries is typically about 600 psig. Consequently, steam can not be used without compression as an assist gas for hydrotreaters/hydrocrackers operating above this pressure level. Therefore, the use of a slipstream of recycle gas or make-up gas advantageously allows implementation of a gas-assisted spray nozzle for fluid injection into the reaction section.

It should thus be appreciated that formation of micron-sized droplets has numerous significant advantages. For example, when injecting the same amount of water, the interfacial area for heat and mass transfer is substantially increased where smaller droplets are sprayed into the gas or gas/liquid stream. Consequently, water saturation of the gas phase (e.g., the hydrotreater/hydrocracker effluent) occurs much more rapidly. Thus, the water distribution to the downstream exchanger (or reactor effluent air cooler) is improved as the water-saturated vapor phase is generally not affected by gravitational settling and tends to distribute more uniformly than the remaining unvaporized water phase. Moreover, micron-sized droplets also substantially reduce the rate of gravity settling for the unvaporized droplets, which allows for improved distribution of the unvaporized water phase, as smaller droplets are more likely than large droplets to remain entrained with, and distribute similarly to the vapor phase. Furthermore, the use hydrogen-rich make-up gas as the assist gas has the additional benefit of effectively scrubbing into the unvaporized water phase trace contaminants (e.g., hydrogen chloride) which may be present in the make-up gas.

Yet further, as the liquid orifices of the gas-assisted nozzles are much larger as compared to non gas-assisted nozzles (producing similarly sized droplets), clogging problems otherwise likely to occur with non gas-assisted nozzles are reduced or even entirely eliminated.

Thus, specific embodiments and applications of gas-assisted nozzles have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of treating an effluent, comprising:
   providing an effluent having a pressure of at least 500 psia;
   injecting a plurality of micron-sized fluid droplets into the effluent using one or more gas-assisted nozzles, wherein the assist gas comprises a process gas involved in the formation of the effluent, and wherein a pressure differential between the assist gas and the effluent is at least 50 psi; and contacting the effluent with a heat transfer surface downstream of the injection location.

2. The method of claim 1 wherein the effluent is produced by a hydroprocessing reactor.

3. The method of claim 1 wherein the fluid droplet is a water droplet.

4. The method of claim 1 wherein the process gas has a pressure of at least 600 psi.

5. The method of claim 1 wherein the process gas is a hydrogen-containing recycle gas or a hydrogen-rich make-up gas.

6. The method of claim 1 wherein the micron-sized droplets have a Sauter mean diameter of between 50 and 500 micron.

7. The method of claim 1 wherein the heat transfer surface is included in an air cooler or shell-and-tube type heat exchanger.

8. A gas treatment apparatus comprising:
a reactor that is configured to produce a reactor effluent having a pressure of at least 500 psia, and a conduit configured to receive the reactor effluent;
one or more gas-assisted nozzles coupled to the conduit and configured to provide a plurality of micron-sized droplets into the reactor effluent, wherein the assist gas comprises a process gas involved in the formation of the effluent, and wherein a pressure differential between the assist gas and the effluent is at least 50 psi; and
a heat exchanger or air cooler downstream of and fluidly coupled to the conduit, wherein the heat exchanger or air cooler are configured to contact and cool the effluent gas.

9. The apparatus of claim 8 wherein the reactor is a hydroprocessing reactor.

10. The apparatus of claim 8 wherein the micron-sized droplets are water droplets.

11. The apparatus of claim 8 wherein the micron-sized droplets have a Sauter mean diameter of between 50 and 500 micron.

12. The apparatus of claim 8 wherein the process gas is a hydrogen-containing recycle gas.

13. The apparatus of claim 8 wherein the process gas is a hydrogen-rich make-up gas.

14. The apparatus of claim 8 wherein the process gas has a pressure of at least 600 psi.

15. A gas treatment apparatus comprising:
a distillation column that is configured to produce from a feed a vapor effluent, and a conduit configured to receive the effluent;
one or more gas-assisted nozzles coupled to the conduit and configured to provide a plurality of micron-sized droplets into the vapor effluent; and
a heat exchanger or air cooler downstream of and fluidly coupled to the conduit, wherein the heat exchanger or air cooler are configured to receive and cool the effluent gas; and
wherein the assist gas comprises a process gas that is used in, or produced by processing of the feed and wherein a pressure differential between the assist gas and the effluent is at least 20 psi.

16. The gas treatment apparatus of claim 15 wherein the micron-sized droplets have a Sauter mean diameter of less than 500 micron.

* * * * *